US005163535A

United States Patent [19]

Jolie

[11] Patent Number: 5,163,535

[45] Date of Patent: Nov. 17, 1992

[54] TIMING MECHANISM

[76] Inventor: Thomas J. Jolie, 225 Main Street East, #7, Milton, Ontario, L9T 1N9, Canada

[21] Appl. No.: 699,985

[22] Filed: May 13, 1991

[51] Int. Cl.[5] .......... F03G 1/00; F16H 27/00; G04B 15/00

[52] U.S. Cl. .......... 185/38; 74/1.5; 368/125; 368/134

[58] Field of Search .......... 74/1.5, 97.1, 100.1; 185/38; 368/125, 134

[56] References Cited

U.S. PATENT DOCUMENTS

| | | | |
|---|---|---|---|
| 2,385,011 | 9/1945 | Lurtz | 74/1.5 |
| 2,924,102 | 2/1960 | Drouhot | 368/125 X |
| 2,970,427 | 2/1961 | Douglass | 74/1.5 X |
| 3,083,657 | 4/1963 | Theenhausen et al. | 185/38 X |
| 3,400,283 | 9/1968 | Altenburger | 368/170 X |
| 3,626,691 | 8/1969 | Bonsack | 368/169 |
| 4,139,981 | 2/1979 | Nozawa et al. | 368/134 |

FOREIGN PATENT DOCUMENTS

| | | | |
|---|---|---|---|
| 269009 | 8/1970 | U.S.S.R. | 368/125 |

*Primary Examiner*—Leslie A. Braun
*Assistant Examiner*—David W. Laub
*Attorney, Agent, or Firm*—Krass & Young

[57] ABSTRACT

In a governor of the type which is used for regulating the angular velocity of a toothed gear wheel which is biased to rotate, the improvement which comprises an inertial mass affixed to one end of a spring, the other end of the spring being affixed to a ratchet bar of the governor whereby said end of the spring affixed to the inertial mass moves from an unloaded position just before a change in direction of oscillation, to a loaded position, and then back to an unloaded position just after the direction of oscillation has changed.

20 Claims, 3 Drawing Sheets

TIMING MECHANISM

BACKGROUND OF THE INVENTION

This invention relates to governors for mechanical timing mechanisms and more particularly to oscillating governors of the type with a ratchet bar having opposed ends which engage the teeth on a gear which is biased to rotate.

The security of handling cash in theft sensitive areas includes many physical protections. In many institutions, short term cash supplies are sealed in a drawer which opens only after a delay imposed by a timer. The interval is short enough that it offers no serious inconvenience, but it is longer than the time a thief is prepared to remain on the premises.

The M. H. Rhodes Co., a Connecticut manufacturer, has commercially marketed a timer for use on cash drawers. This particular timer has been unchanged for at least fifteen years. The product is commercially successful. However, the timer is prone to spontaneous failure, that is, it stops instantaneously and unpredictably, without bushing or pivot wear, and without significant contamination by foreign particles. The problem of stoppage is aggravated by the consequence that the cash which it protects becomes inaccessible until repairs can be made. The timer is often installed under a service contract. Under a service contract, an unreliable mechanism can cause unrecoverable costs. Installers particularly have a need for a more reliable mechanism.

The cause of the spontaneous stoppage lies in the governor. Every half cycle the ratchet bar must come to a full stop before it oscillates back in an opposite direction. This stoppage of the ratchet bar coincides with the maximum friction between the gear and an engaging tooth on the ratchet bar. Usually the angular force of the rotating gear is sufficient to overcome the momentary hiatus in ratchet bar motion; however, occasionally the ratchet bar locks against a gear tooth.

To correct the problem, the ratchet bar requires a means to store its dynamic energy when it temporarily stops before changing direction. It is an object of this invention to provide a means to store dynamic energy and thereby overcome the problem of erratic stoppage.

On Feb. 9, 1960, U.S. Pat. No. 2,924,102 issued to G. Drouhot. Droughot was concerned with the problem of "galloping" in a governor which resulted from excessive rotational bias on the toothed gear coupled with a shock or jolt to the mechanism. Drouhot proposed regulating the angular velocity of the rocker member by providing a reed member on the rocker, said reed member being inherently tuned to be mechanically resonant at a predetermined frequency or natural oscillation. One embodiment of Drouhot's invention included a V-shaped rocker having a reed projecting outwardly at the centre of the V. The reed is required to project substantially outwardly in order to counter-balance the weight of the V-shaped rocker about its centrally located pivot. This is necessary to balance the rocker and thereby minimize the effect of external shock G. Drouhot did not address the problem of rocker stoppage, nor did he identify the solution of providing a preservoir to store the dynamic energy of the rocker in order to have that same energy available to overcome any momentary hiatus in movement of the rocker. Furthermore in his patent specification, the flexural oscillation of the reed occurs during the entire motion of the rocker.

The invention provides for a diming mechanism having governor for regulating the angular velocity of one toothed gear wheel in a plurality of intermeshing gear wheels, said governor having a ratchet bar with opposite ends; a rod projecting perpendicularly through the centre of gravity of the ratchet bar; a tooth on each opposite end of the ratchet bar, each tooth projecting generally in the same direction and perpendicular to the ratchet bar, said teeth adapted to engage the teeth on the one gear wheel biased to rotate about an axis parallel to the rod whereby said ratchet bar oscillates between a first position in which one tooth is engaged with the gear and a second position in which the other tooth is engaged with the one gear wheel said gear wheel advancing ½ tooth with each change in position of the ratchet bar; a spring having one end affixed to the ratchet bar; and an inertial mass affixed to the other end of the spring wherein said end of the spring being affixed to the inertial mass moves from an unloaded position just before the change in direction of oscillation, to a loaded position, and then back to the unloaded position just after the direction of oscillation has changed.

With the present invention, the spring and the inertial mass are inert for the greater part of the ratchet bar's travel. This is unlike the aforementioned use of the oscillating reed in the device of U.S. Pat. No. 2,924,102.

SUMMARY OF THE INVENTION

According to the invention, there is provided a timing device that has a toothed gear adapted to rotate about an axis; a governor for regulating the angular velocity of said toothed gear, said governor including a ratchet bar having opposite ends, a rod projecting perpendicularly through the centre of gravity of the ratchet bar and parallel to said axis, a tooth on each opposite end of the ratchet bar, each tooth projecting generally in the same direction and perpendicular to the ratchet bar, the two teeth adapted to engage the teeth on said gear, whereby said ratchet bar oscillates between a first position in which one tooth thereof is engaged with the gear and a second position in which the other tooth is engaged with the gear, said gear advancing ½ gear tooth with each change in position of the ratchet bar, and an inertial mass affixed to one end of a spring, the other end of the spring being affixed to the ratchet bar, whereby said end of the spring affixed to the inertial mass moves from an unloaded position just before the change in direction of oscillation, to a loaded position, and then back to the unloaded position just after the direction of oscillation has changed. The string and inertial mass provide means for assisting the ratchet bar to initiate the motion which causes each tooth thereof to disengage the gear. The timing mechanism further includes a primary wheel having a toothed periphery and means for rotating this primary wheel. The aforementioned gear is one of a plurality of intermeshing gear wheels each with a central shaft, a toothed periphery and a toothed smaller diameter.

BRIEF DESCRIPTION OF THE DRAWINGS

This invention is illustrated in particular and preferred embodiment by reference to the accompanying drawings, in which.

DETAILED DESCRIPTION OF PREFERRED EMBODIMENT

Figure 1:
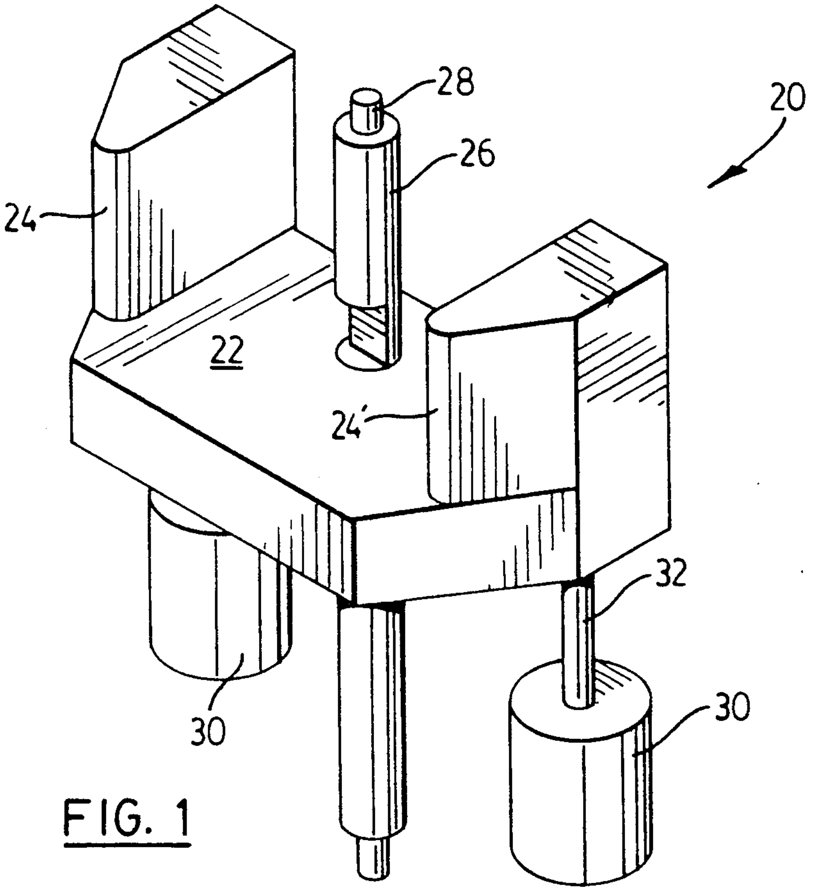
FIG. 1 is a perspective view of a governor having inertial masses attached to a ratchet bar by a spring.

FIG. 1 shows a governor 20. A ratchet bar 22 has opposite ends, each end having a laterally projecting tooth 24, 24' adapted to engage in a toothed gear (shown only in ,FIG. 3 and FIG. 4). The ratchet bar 22 and teeth 24, 24' are preferably integrally formed from nylon or plastic. Symmetrically disposed flat springs 32 each have one end affixed to the ratchet and the other end affixed to inertial masses 30. Each spring is shown to projecting downwardly from an opposite end of the ratchet bar; however, the governor would be functional if the symmetrical springs 32 projected outwardly in any direction from the ratchet bar. A rod 26 is projected through the centre of gravity of the governor in a direction which is parallel to an engaging face of the teeth 24, 24'. The rod 26 has reduced end portions 28 to facilitate pivotal attachment. In a preferred embodiment the inertial masses 30 are made of brass and have a height of 2.5 mm and a diameter of 2.5 mm. The springs 32 should be made of steel. They should be about 0.1 mm×0.4 mm and have sufficient length to space the inertial masses 30 about 3 mm from the ratchet bar 22. The ratchet bar and teeth may be integrally formed of plastic.

Figure 2:
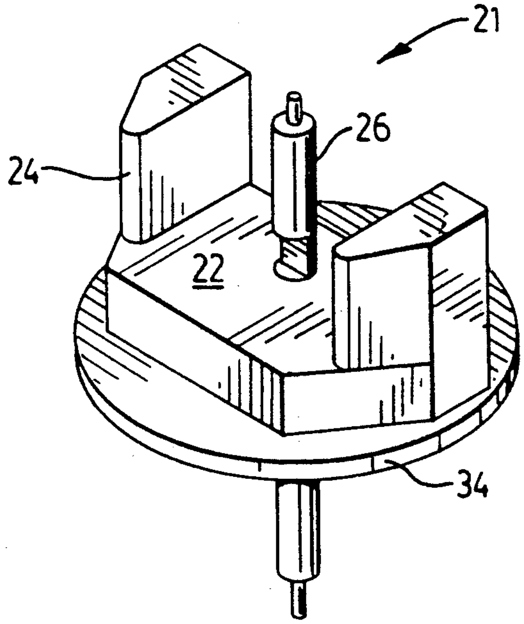
FIG. 2 PRIOR ART
FIG. 2 is a perspective view of a governor of the type existent in the prior art.

FIG. 2 shows a governor 21 of the type used in the prior art. The ratchet bar 22 and teeth 24 are formed of a nylon. An inertial disk 34 made of metal is concentrically mounted on the shaft 26 under the ratchet bar 22.

Figure 3:
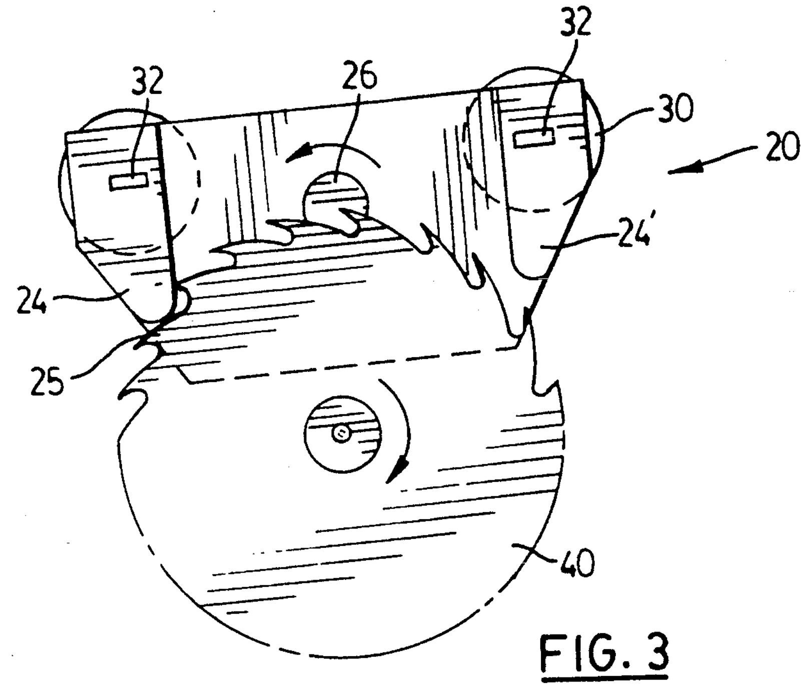
FIG. 3 is a plan view of the governor engaged with a gear in a first position.
Figure 4:
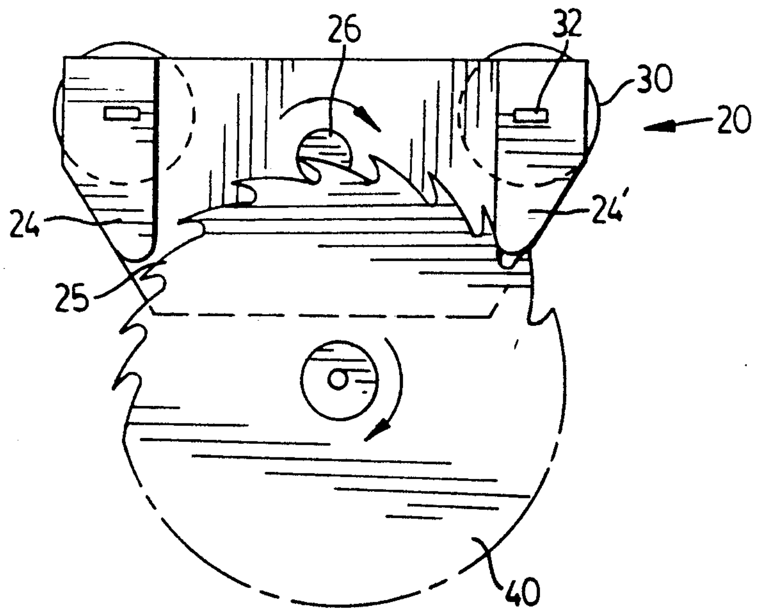
FIG. 4 is a plan view of the governor and gear shown in FIG. 3 but in a second position.

FIG. 3 shows a plan view of the governor 20 pivotally mounted adjacent to a toothed gear 40. Its function is to prevent the gear 40 from rotating too quickly. The governor 20 is positioned sufficiently close to the gear 40 so that it prevents the free turning of the gear 40. In order for a gear tooth 25 to pass by a tooth 24, 24' on one end of the governor 20 it must push the tooth 24 on that end of the governor outwards from the centre of the gear. When one end of the governor is pushed outwards, the tooth 24' on the other end of the governor is pushed inwards, into the space between the teeth on the gear. The gear 40 is then prevented from turning by the other tooth 24' on the governor. Referring to FIG. 4, we see that in order for the gear 40 to continue turning the tooth 24' on the other end of the governor must be pushed outwards, which forces the tooth on the first end of the governor between the teeth on the gear again. The cycle must be repeated each time the gear rotationally advances one tooth.

It can be appreciated that when the governor 20 rotates in a counter clockwise direction about rod 26 into a first position shown in FIG. 3, the counter clockwise momentum in the inertial masses bends the springs 32 immediately after the counter clockwise rotational motion of the governor is halted by the gear. When the inertial masses 30 cease moving they have transferred their momentum into the spring (as kinetic energy). The springs 32 then spring back to their original shape thereby initiating motion of the governor 20 in a clockwise direction. Gear tooth 25 then continues, moving governor tooth 24 outwardly and rotating governor 20 until governor tooth 24' is forced inwardly between the teeth of the gear 20. At this second position shown in FIG. 4, the governor is abruptly halted. The clockwise momentum in the inertial masses bends the springs 32. When the masses 30 cease moving they have transferred their momentum into the springs (as kinetic energy). The springs then spring back to their original shape thereby initiating motion of the governor 20 in a counter clockwise direction. This motion continues until the governor reaches the first position shown in FIG. 3. The cycle is then repeated. This cycle must be repeated each time the gear rotationally advances one tooth.

Figure 5:
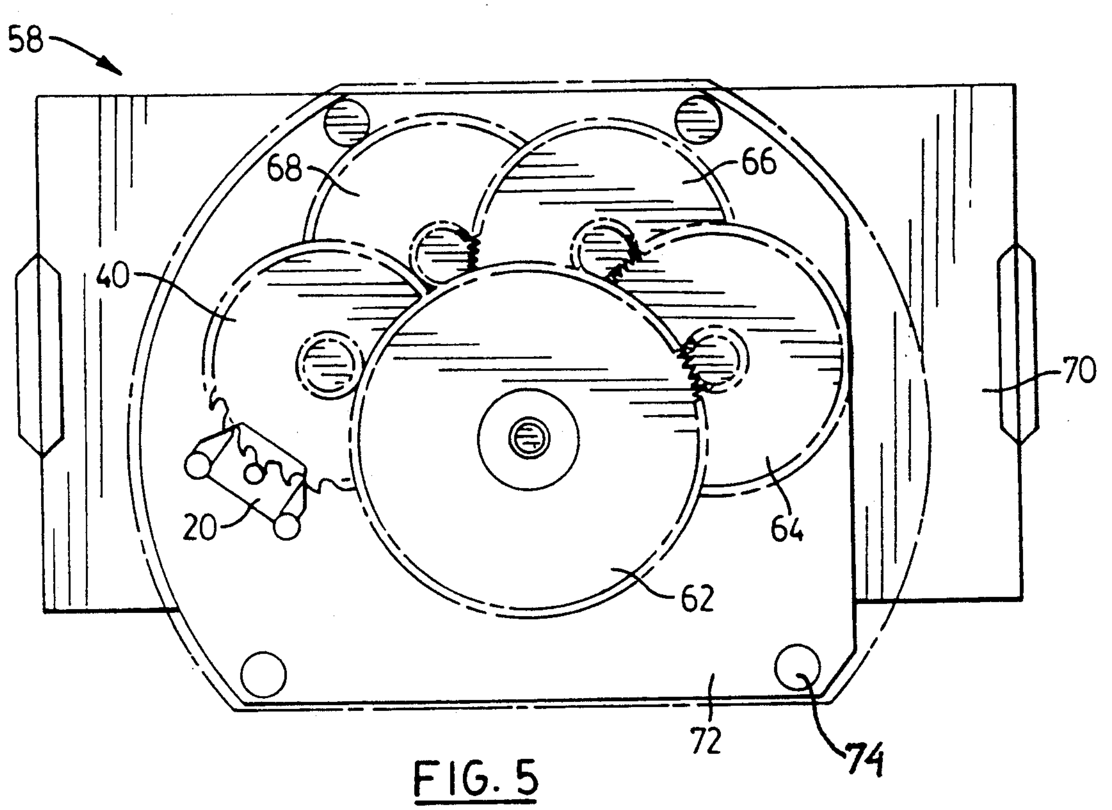
FIG. 5 is a partially broken away plan view of a timer having a governor as shown in FIG. 1.
Figure 6:
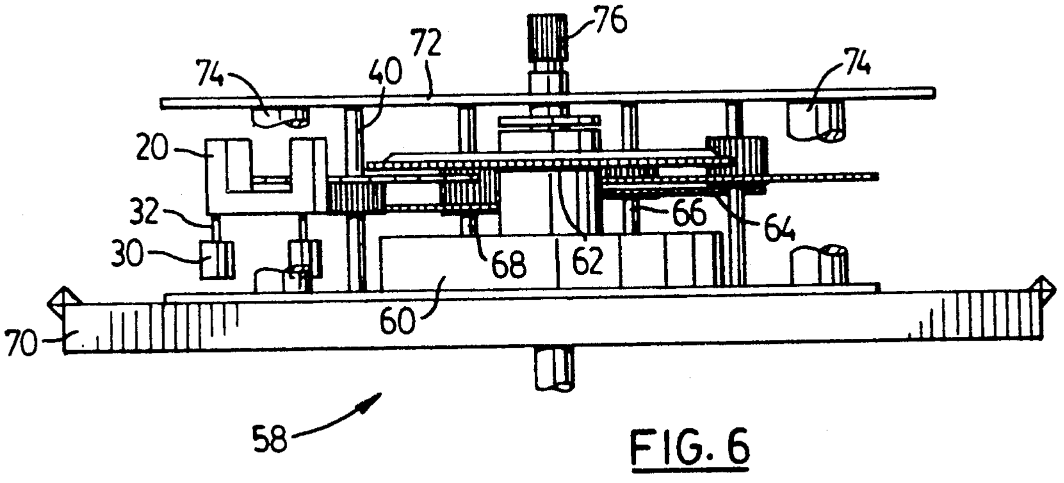
FIG. 6 is a partially broken away elevational view of the timer and the governor shown in FIG. 5.

A timer 58 of the type made by M. H. Rhodes Co. is shown in FIG. 5 and FIG. 6. The timer has a governor 20 similar to that shown in FIG. 1. A mainspring 60 biases a primary wheel 62 to rotate. The primary wheel 62 rotates a first gear wheel 64 which rotates a second gear wheel 66 which rotates a third gear wheel 68 which rotates a last gear wheel 40 which engages the governor 20. The primary wheel turns slowly and each successive driven gear wheel turns more quickly than the respective wheel which biases it to rotate.

The wheels are rotatably mounted between a mounting plate 70 and an opposite plate 72. Spacers 74 maintain the plates 70, 72 in proper alignment and spaced relationship. The spacers are partially broken away in FIG. 6 to better expose the interior of the timer. An end of the primary wheel 62 is broken away. Said end is provided with a cam (not shown) which engages a lock. The other end of the shaft of the primary wheel 62 is provided with a spline 76 by which the primary wheel 62 can be gripped in order to wind the timing mechanism 58.

I therefore claim:

1. A timing mechanism comprising:

a primary wheel having a toothed periphery concentrically mounted on a shaft;

means for rotating said primary wheel;

a plurality of intermeshing gear wheels each with a central axis of rotation, a toothed periphery and a toothed smaller diameter, a first of said gear wheels having one set of teeth mated with the teeth on said primary wheel, subsequent gear wheels of said plurality of gear wheels each having one set of teeth mated with a set of teeth on the preceding gear wheel, a governor for regulating the angular velocity of one of said gear wheels, said governor including a ratchet bar having opposite ends and opposite faces; a rod projecting perpendicularly through the centre of gravity of the ratchet bar and parallel to said axis, and a tooth on each opposite end of the ratchet bar, each tooth projecting generally in the same direction and perpendicular to the ratchet bar, the two teeth adapted to engage the teeth on said one gear wheel, whereby said ratchet bar is adapted to oscillate between a first position in which one tooth thereof is engaged with said one gear wheel and a second position in which the other tooth is engaged with said one gear wheel, said one gear wheel advancing a predetermined distance with each change in position of the ratchet bar;

means for assisting said ratchet bar to initiate the motion which causes each tooth thereof to disengage said one gear wheel, said assisting means including a first spring member having first and second ends, and a first inertial mass affixed to the first end of said first spring member, wherein said first spring member has its second end affixed to the governor so that its first end moves from an unloaded position just before the change in direction of oscillation, to a loaded position, and then back to an unloaded position just after the direction of oscillation has changed, and means to rotatably mount and maintain the governor, gear wheels and primary wheel operable intermeshed.

2. A timing mechanism as claimed in claim 1, wherein the two teeth are on one face of the ratchet bar and said first spring member is on the other opposite face.

3. A timing mechanism as claimed in claim 2, further comprising a second inertial mass affixed to a first end of a second spring member, said first and second masses being symmetrical about the rod.

4. A timing mechanism as claimed in claim 3, wherein when said rod extends generally in the vertical direction, the first and second masses are below the ratchet bar.

5. A timing mechanism as claimed in claim 4, wherein the first and second spring member are substantially straight and parallel to the rod.

6. A timing mechanism as claimed in claim 5, wherein the ratchet bar and teeth are integrally formed of plastic.

7. A timing mechanism according to claim 3 wherein said governor regulates the angular velocity of the last of said gear wheels by engaging the teeth on the periphery thereof.

8. A timing mechanism as claimed in claim 7, wherein the first and second spring members are made of steel and the first and second masses are made of brass.

9. A timing mechanism according to claim 1 wherein said governor regulates the angular velocity of a last gear of said plurality of gear wheels by engaging the teeth on the periphery thereof.

10. A timing mechanism as claimed in claim 1 further comprising a second inertial mass affixed to a first end of a second spring member, said first and second masses being symmetrical about the rod.

11. A timing mechanism as claimed in claim 10 wherein said mounting and maintaining means comprise two parallel, spaced-apart plates and the rod has end portions mounted in holes in said two plates.

12. A timing mechanism as claimed in claim 10 wherein, when said rod is arranged generally vertically, the first and second masses are below the ratchet bar.

13. A timing mechanism as claimed in claim 12 wherein the ratchet bar and teeth are integrally formed of plastic.

14. A timing mechanism comprising:

a mainspring;

a primary wheel having a toothed periphery concentrically mounted on a shaft which is biased to rotate by the mainspring;

a plurality of intermeshing gear wheels, each gear wheel having a central axis of rotation, a toothed periphery and a toothed smaller diameter, both concentrical about said axis, first of said gear wheels having the teeth on its smaller diameter mated with the teeth on the primary wheel, subsequent gear wheels of said plurality of gear wheels each having the teeth on its smaller diameter mated with the teeth on the periphery of the preceding gear wheel, and a last of said gear wheels intermeshed to the preceding gear wheel;

a governor for regulating the angular velocity of the last of said gear wheels, said governor comprising a ratchet bar having opposite ends and opposite faces, a rod projecting perpendicularly through the centre of gravity of the ratchet bar and parallel to said axis, a tooth on each opposite end of the ratchet bar, each tooth projecting generally in the same direction and perpendicular to the ratchet bar, the two teeth adapted to engage the teeth on said last gear wheel, whereby said ratchet bar is adapted to oscillate between a first position in which one tooth thereof is engaged with said last gear wheel and a second position in which the other tooth is engaged with said last gear wheel, said last gear wheel advancing a predetermined distance with each change in position of the ratchet bar;

means for assisting said ratchet bar to initiate the motion which causes each tooth of said ratchet bar to disengage said last gear wheel, said assisting means including a first spring having one end affixed to the ratchet bar, and an inertial mass affixed to the other end of the first spring, wherein said end of the first spring affixed to the inertial mass moves from an unloaded position just before the change in direction of oscillation, to a loaded position, and then back to the unloaded position just after the direction of oscillation has changed;

means to rotatably mount and maintain the governor, gear wheel and primary wheel operably intermeshed and in parallel alignment.

15. A timing mechanism as claimed in claim 14 wherein the governor further comprises a second inertial mass affixed to a first end of a second spring, said first and second masses being symmetrical about the rod.

16. A timing mechanism as claimed in claim 15, wherein, when said rod of the governor is arranged to extend generally vertically, the masses are below the ratchet bar.

17. A timing mechanism as claimed in claim 16, wherein the first and second springs are substantially straight and parallel to the rod.

18. A timing mechanism as claimed in claim 17, wherein the ratchet bar and teeth are integrally formed of plastic.

19. A timing mechanism as claimed in claim 18, wherein the first and second springs are made of steel and the first and second masses are made of brass.

20. A timing mechanism as claimed in claim 19, wherein said mounting and maintaining means comprise two parallel, spaced apart plates and the rod has end portions mounted in holes in said two plates.

* * * * *